United States Patent [19]
Sasaki

[11] Patent Number: 5,825,828
[45] Date of Patent: Oct. 20, 1998

[54] METHOD AND APPARATUS FOR MULTI-LEVEL QUADRATURE AMPLITUDE MODULATION

[75] Inventor: Eisaku Sasaki, Tokyo, Japan

[73] Assignee: NEC Corporation, Tokyo, Japan

[21] Appl. No.: 678,100

[22] Filed: Jul. 11, 1996

[30] Foreign Application Priority Data

Jul. 12, 1995 [JP] Japan .................................. 7-175981

[51] Int. Cl.[6] .................................................. H04L 27/36
[52] U.S. Cl. ........................ 375/298; 375/264; 332/103
[58] Field of Search .................................. 375/298, 261,
375/241, 286, 264; 332/103

[56] References Cited

U.S. PATENT DOCUMENTS

| 4,665,532 | 5/1987  | Fukuda et al. ............................. 375/19 |
| 4,965,536 | 10/1990 | Yoshida .................................... 375/298 |
| 5,200,978 | 4/1993  | Lo Curto et al. ....................... 375/298 |
| 5,363,410 | 11/1994 | Hayashi ................................... 375/298 |

FOREIGN PATENT DOCUMENTS

| 0503588   | 9/1992  | European Pat. Off. . |
| 60-178753 | 9/1985  | Japan . |
| 4-208741  | 7/1992  | Japan . |
| 9528050   | 10/1995 | WIPO . |

*Primary Examiner*—Temesghen Ghebretinsae
*Attorney, Agent, or Firm*—Ostrolenk, Faber, Gerb & Soffen, LLP

[57] ABSTRACT

A method and an apparatus is provided for a multi-level quadrature amplitude modulation system, in which the DC level of the output is "0" even when the modulation multi-level number is varied and mean electric power becomes almost the same. The multi-level quadrature amplitude modulation system is capable of modulating at different modulation multi-level numbers. The method of operating the system includes the steps of converting all of the input bit numbers into the same bit number based on a prescribed conversion rule for each orthogonal channel irrespective of the modulation multi-level number of the system, filtering the converted signal by a digital filter, converting the output of the digital filter into an analog signal by a D/A converter, and modulating the analog signal by a quadrature modulator.

6 Claims, 5 Drawing Sheets

FIG.5

| MODULATION SYSTEM | 64QAM | | 16QAM | | QPSK | |
|---|---|---|---|---|---|---|
| | INPUT | OUTPUT | INPUT | OUTPUT | INPUT | OUTPUT |
| | 111 | 0111(+7) | 11 | 0110(+6) | 1 | 0100(+4) |
| | 110 | 0101(+5) | | | | |
| | 101 | 0011(+3) | 10 | 0010(+2) | | |
| | 100 | 0001(+1) | | | | |
| | 011 | 1111(-1) | 01 | 1110(-2) | 0 | 1100(-4) |
| | 010 | 1101(-3) | | | | |
| | 001 | 1011(-5) | 00 | 1010(-6) | | |
| | 000 | 1001(-7) | | | | |
| DC LEVEL | 0 | | 0 | | 0 | |
| SIGNAL POINT SPACE (d) | 2 | | 4 | | 8 | |
| MEAN POWER | $42d^2$ | | $10d^2$ | | $2d^2$ | |
| RELATIVE MEAN POWER | 0 dB | | -0.2 dB | | -1.2 dB | |

METHOD AND APPARATUS FOR MULTI-LEVEL QUADRATURE AMPLITUDE MODULATION

BACKGROUND OF THE INVENTION

The present invention relates to a method and an apparatus for multi-level quadrature amplitude modulation used in a digital microwave communication system and more particularly to a method and an apparatus for multi-level quadrature amplitude modulation always setting a DC level to 0 irrespective of a modulation multi-level number.

In a digital microwave communication system, a multi-level quadrature amplitude modulation system such as 64 quadrature amplitude modulation (64 QAM) is used for aiming at effective utilization of a frequency band. In such a modulation system, a digital filter (a rolloff filter) for waveform shaping is required for a modulator and a demodulator, respectively. A digital filter for performing filtering by digital signal processing on the time base of the baseband has been used in recent years owing to progress of digital signal processing techniques and the working speed and degree of integration of a device. Also, digital filters without problems of dispersion and change with the passage of time of characteristics, temperature variation and so on have been developed.

In general, there are two types of digital filters, an Infinite Impulse Response (IIR) type and a Finite Impulse Response (FIR) type, but the FIR type capable of realizing a linear phase is used in the digital microwave communication system.

A structure of the FIR type digital filter will be described with reference to the drawings.

FIG. 1 shows a block diagram of one channel portion of a rolloff filter on transmission side for QPSK composed of a conventional FIR type digital filter.

A row of data are inputted from a terminal 81 and passes in a shift register 151. The data of respective registers are inputted to taps (multipliers) 411 to 416, and multiplied by tap coefficients. The outputs of respective taps 411 to 416 are inputted to an adder 311, and the outputs from all the taps are added and outputted. At this time, sampling values of impulse response corresponding to frequency characteristics of the digital filter become tap coefficients Cj (j is an integer from −N to N in the case of (2N+1) taps) of respective taps. When it is assumed that the data located inside the shift register are ak-j, the output bk of the digital filter is expressed as follows:

$$bk = \sum_{j=-N}^{N} ak-j \cdot Cj \quad (1)$$

and frequency characteristics corresponding to discrete Fourier transform of the tap coefficients Cj are given. When the number of taps is increased infinitely, it is possible to realize optional frequency characteristics. The number of rows of the input signal at time of a modulation system of more multi-values is m/2 one channel when it is assumed that a modulation multi-level number is $2_m$.

A digital filter whose input bit number is i can also be used for a modulation system whose input bit number is i or below by using high order bits of the input.

However, there is such a problem that a DC level (a medium value of all signal points) and mean power of the digital filter output are changed with the alteration of the modulation system only by altering the number of used input bits.

For example, a case that two high order bits among the input in three bits of a circuit for 64 QAM are used for 16 QAM is considered. When a signal of a single channel is expressed with a 2' complement, the input signal becomes from −4 to +3 in 64 QAM, and the DC level becomes −0.5 as shown in FIG. 2 (A). However, when the third bit which is not used in 16 QAM is fixed at "0", the DC level becomes −1as shown in FIG. 2(B), and when the third bit is fixed at "1", the medium value of all the levels becomes 0 as shown in FIG. 2(C).

The output of the digital filter is inputted to a quadrature modulator after being converted into an analog signal by means of a D/A converter, but the quadrature modulator is direct-current-coupled with the D/A converter, and is adjusted at the original DC level. Thus, it becomes necessary to readjust the quadrature modulator when the DC level of the digital filter output is changed.

Furthermore, when the number of used bits is increased consecutively from high order, the mean power is changed along with the increase of the multi-level number.

The analog portion of the quadrature modulator has such a problem that, since power value levels (level diagram) of respective parts are set so that both the distortion characteristics and the S/N ratio satisfy request values, original characteristics can no longer be maintained when the input level of the quadrature modulator changes largely by setting of the multi-level number.

As against the above, a method that a level compensation circuit is provided between the output of a digital filter and a D/A converter, and the mean power of the input signals of the D/A converter becomes constant in the level compensation circuit irrespective of the modulation system has been proposed. For example, the present method is set forth in Japanese Patent Laid-Open No. Hei 4-208741. This example is shown in FIG. 3. In FIG. 3, digital signal circuits 501 and 502 for signal row number portions perform cosine rolloff waveform processing of binary digital signals, respectively. A digital filter is composed of digital signal circuits 501 and 502 and adding circuits 511 and 512 for adding the outputs thereof. This is a structure referred to as a binary transversal filter (BTF), but it is the same as the FIR type in point of the relationship of input vs. output. The outputs of the digital filter are inputted to D/A converters 531 and 532 through level compensation circuits 521 and 522 and converted into analog signals. Then, the signals are inputted into a quadrature modulator 540, and outputted as a modulated signal. The level compensation circuit is placed between the digital filters and the D/A converters (521, 522) or after the quadrature modulator at 550. When the mean power of the digital filter outputs is changed by the modulation multi-level number, the level compensation circuits 521 and 522 multiply the digital filter output by a constant by means of multipliers so that the output mean power becomes constant. Further, when the DC level is shifted, the level compensation circuits operate so that the DC level becomes constant by means of the adders. When the level compensation circuit 550 is placed at the output of the quadrature modulator, the above-mentioned level compensation is performed by an analog multiplier.

This level compensation circuit is composed of a read only memory (ROM) or a digital multiplier and an adder, the output of the digital filter is normally about 8 bits to 12 bits, and a circuit scale of a multiplier of the bit number in this order becomes considerably large. Furthermore, since oversampling in the order of two times to eight times is made on the digital filter output based on a sampling theorem, the signal speed becomes considerably high. Therefore, a high speed performance is also required for the multiplier and the adder. When the level compensation circuit is composed of a ROM, that which has a large number of bits of the address and is of a high speed is also required.

SUMMARY OF THE INVENTION

It is an object of the present invention to provide a method and an apparatus for multi-level quadrature amplitude modulation capable of altering a multi-level number of a multi-level quadrature amplitude modulation system and also capable of attaining a high speed, low power consumption, a high performance and a small scale of a circuit.

It is another object of the present invention to provide a method and an apparatus for multi-level quadrature amplitude modulation, in which, even when a multi-level number is changed in an FIR type digital filter used in a multi-level quadrature amplitude modulation system, the DC level of the output remains unchanged and the mean power neither changes largely.

The method of multi-level quadrature amplitude modulation of the present invention modulating at different modulation multi-level numbers, and comprises the steps of converting all of the input bit numbers into the same bit number based on a prescribed conversion rule for each orthogonal channel irrespective of the modulation multi-level number of the multi-level quadrature amplitude modulation system described above, filtering the converted signal by means of a digital filter, converting the output of the digital filter into an analog signal by means of a D/A converter, and modulating the analog signal by means of a quadrature modulator.

Further, the multi-level quadrature amplitude modulation system of the present invention is capable of modulation at different modulation multi-level numbers, and comprises a code converter for converting all of the input bit numbers into the same bit number based on a prescribed conversion rule for each orthogonal channel irrespective of the modulation multi-level number of the multi-level quadrature amplitude modulation system, a digital filter for applying waveform shaping to the output of the code converter, a D/A converter for converting the output of the digital filter into an analog signal, and a quadrature modulator for applying quadrature modulation to the output of the D/A converter.

Further, the prescribed conversion rule described above stipulates that, when the system is made to operate as a quadrature amplitude modulation system of a $2^m$ or $2^{m-2n}$ value (m is an integer of 4 or more, and n is an integer of 0 or more), a pattern "1,0,0, . . . " of a bit number (n+1) is added to lower order of the least significant bit of an input signal for the digital input signal in (m/2−n) row thus converting it into a signal in a (m/2+1) row, and the most significant bit of the signal in the (m/2+1) row is inverted thereby to convert it into a 2' complement.

BRIEF DESCRIPTION OF THE DRAWINGS

FIG. 5 is a table showing an embodiment of code conversion with the apparatus for multi-level quadrature amplitude modulation shown in FIG. 4 according to the present invention.

DETAILED DESCRIPTION OF THE PREFERRED EMBODIMENTS

Next, the present invention will be described in detail with reference to the drawings.

Figure 1:
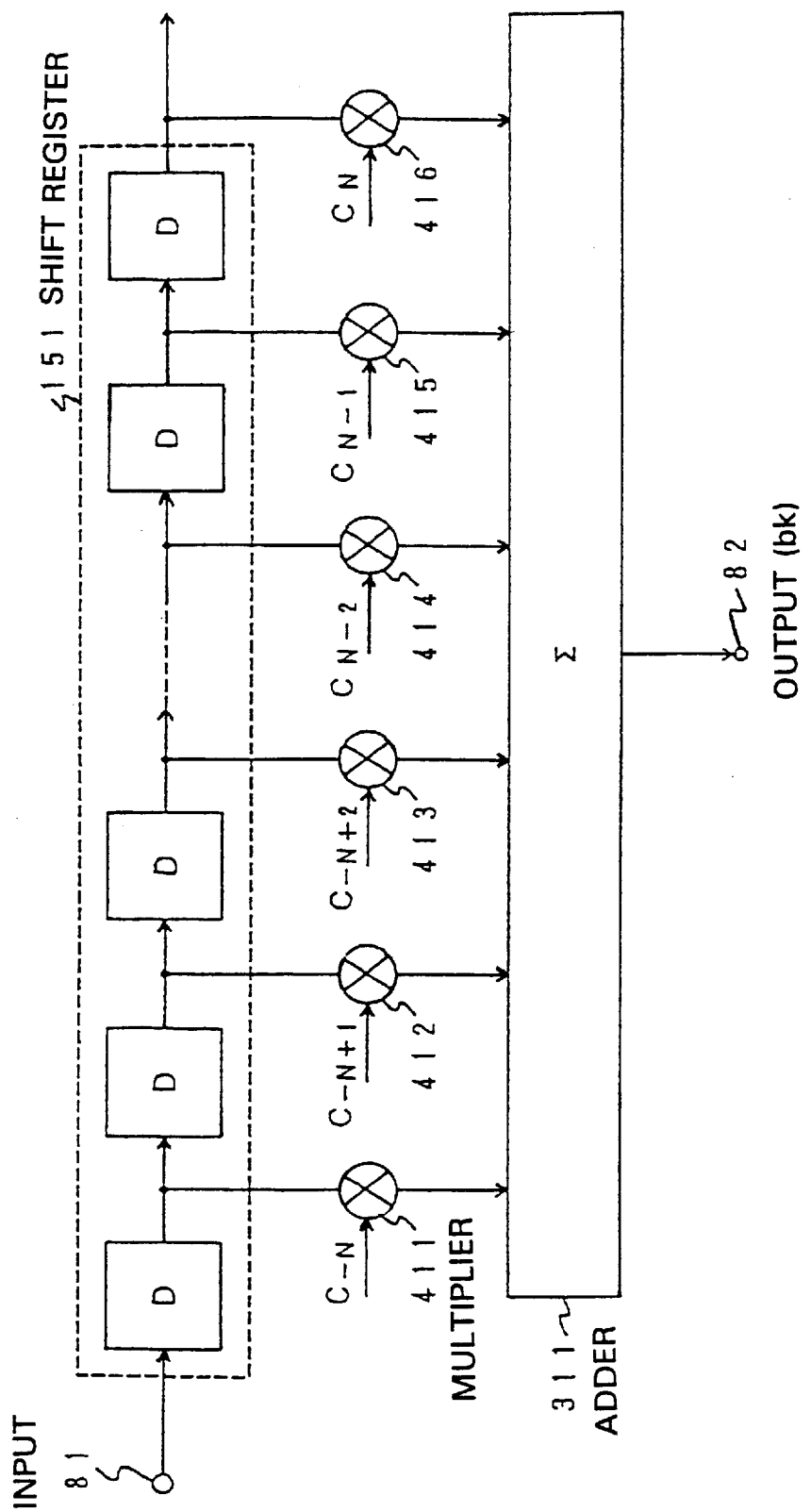
FIG. 1 is a diagram for explaining a circuit configuration of an FIR digital filter.
Figure 2:
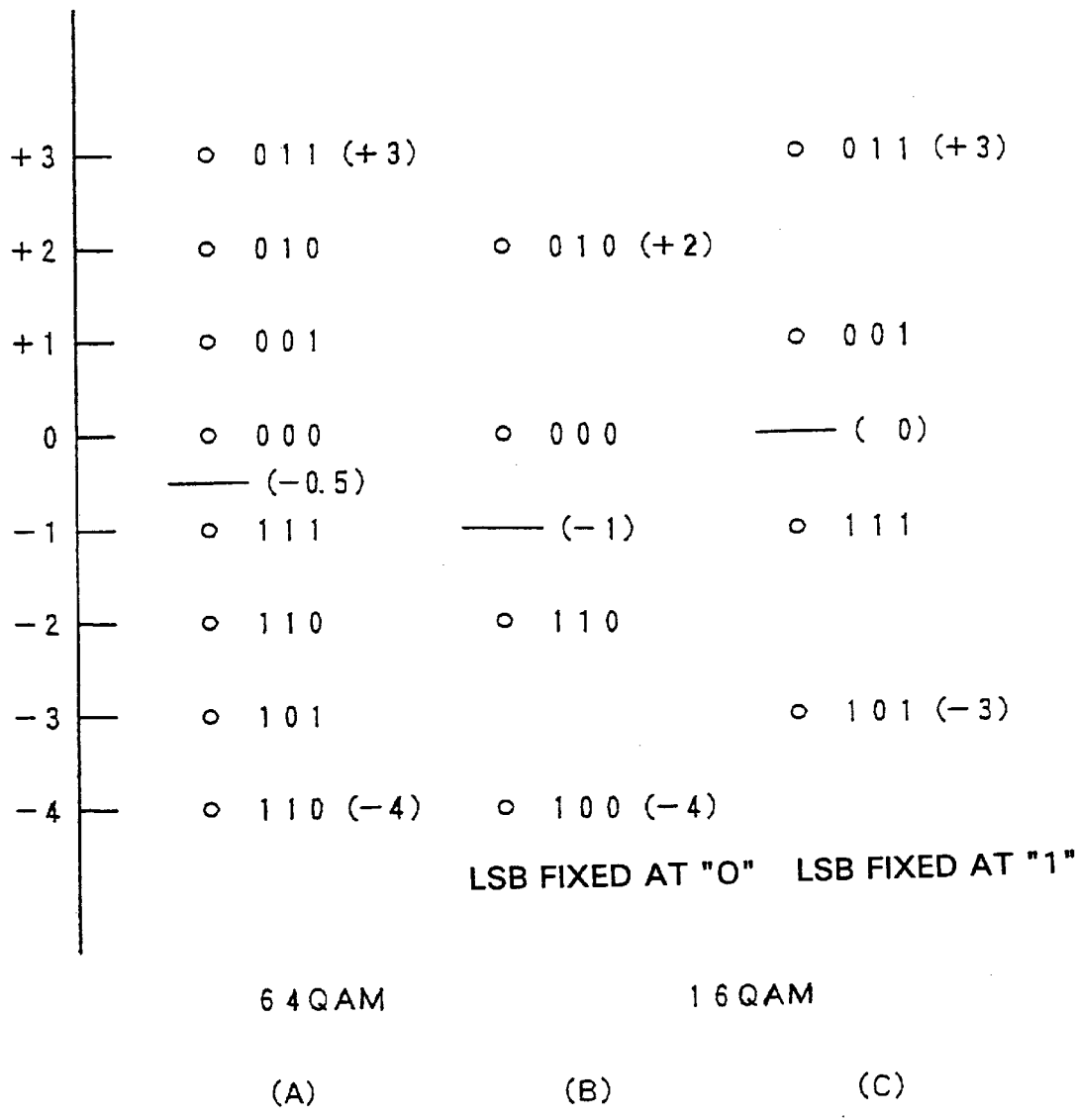
FIG. 2 is a diagram for explaining dislocation of a DC level by a quadrature amplitude modulation system.
Figure 3:
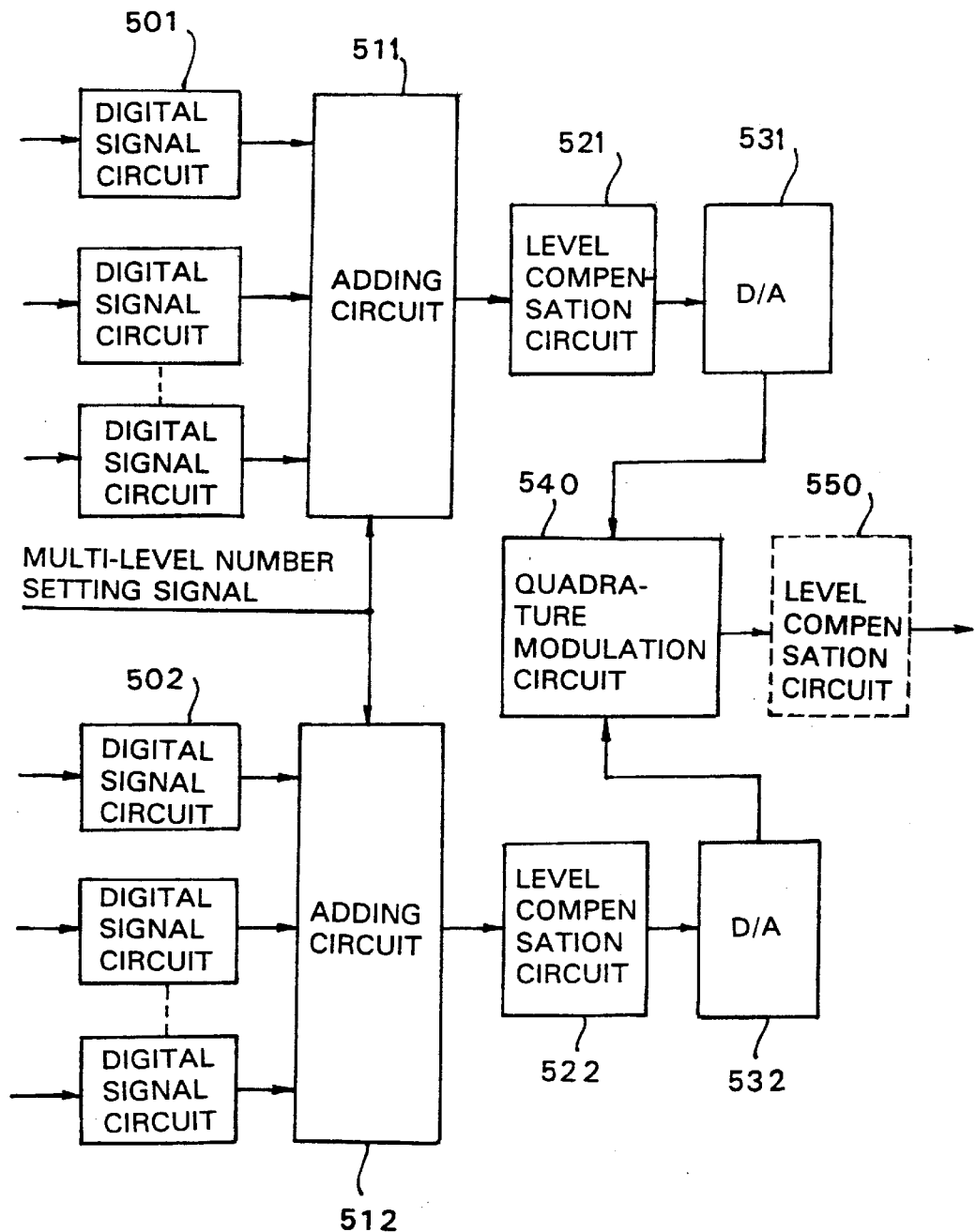
FIG. 3 is a block diagram showing a conventional apparatus for multi-level quadrature amplitude modulation.
Figure 4:
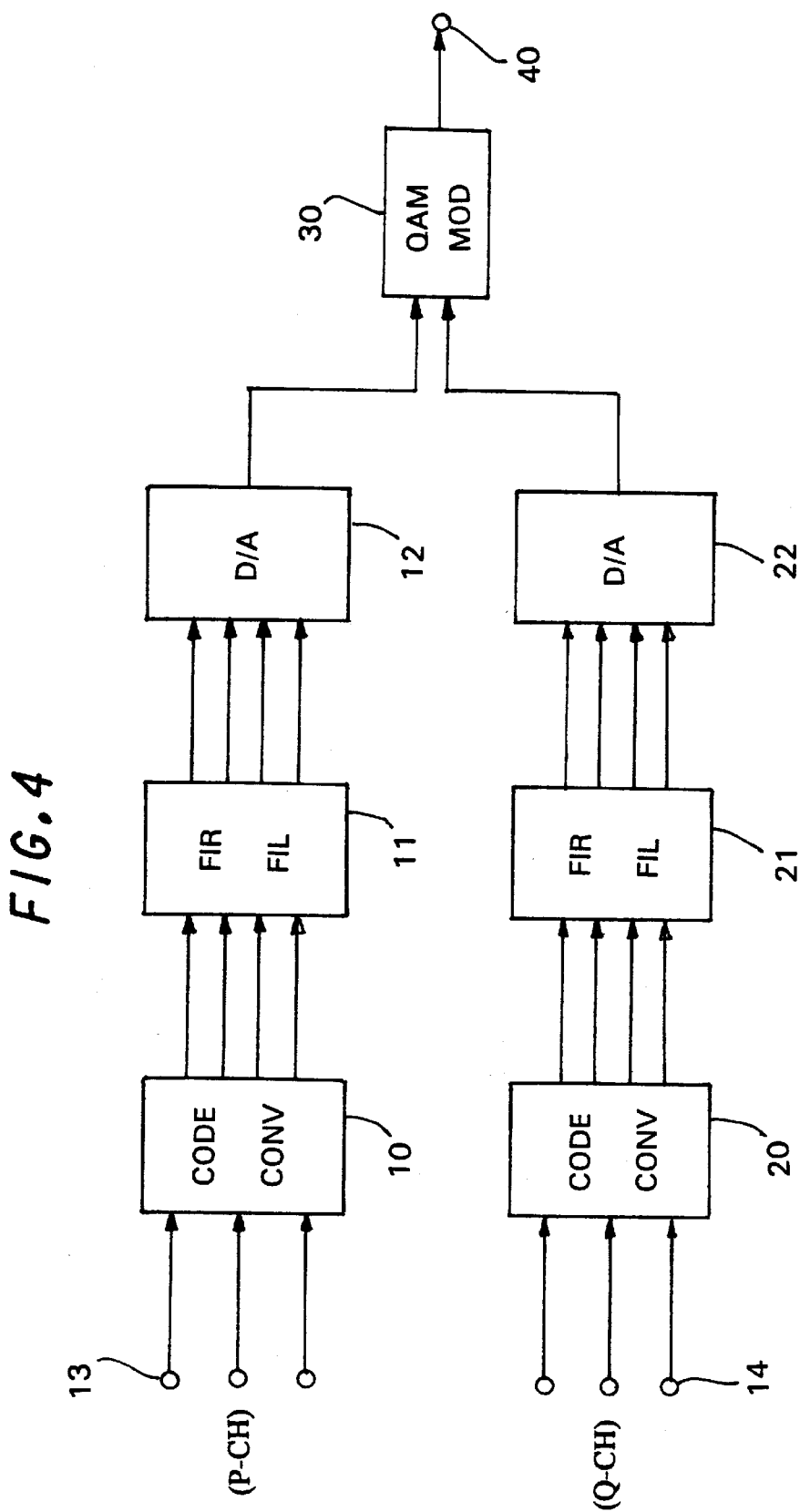
FIG. 4 is a block diagram showing an apparatus for multi-level quadrature amplitude modulation (64 QAM) according to the present invention.

FIG. 4 shows a block diagram in the case of 64 QAM as an example of an apparatus for multi-level quadrature amplitude modulation. Further, FIG. 5 is a configuration table showing an embodiment of a code conversion. First, the structure of FIG. 4 will be described. in a 6 row 64 QAM, three rows of input data signals for each orthogonal channel are inputted to code converters 10 and 20 in providing a code conversion system of the present invention. In the code converters 10 and 20, code conversion shown in FIG. 5 is performed, and the outputs thereof are inputted to digital filters 11 and 21. The digital signals band-limited in the digital filters 11 and 21 are converted into analog signals by means of D/A converters 12 and 22, and two orthogonal channels' portion are inputted thereafter in a quadrature modulator 30 and outputted as a modulated wave.

The code converter has functions of bit addition to inputted bits and MSB inversion based on a fixed conversion rule. These functions can be gained in a comparatively simple manner using a digital signal processor (DSP) for instance.

The operation of the digital filters 11 and 21 is the same as explained as a related art, and these filters are FIR type digital filters. The quadrature modulator 30 multiplies the output signals of the two D/A converters 12 and 22 by a carrier wave having a phase difference of 90°, respectively, and adds the results thereof so as to output a quadrature modulated wave.

The code conversion table shown in FIG. 5 will be explained. The number of input signal rows for one channel of the baseband of the modulator of 64 quadrature amplitude modulation (64 QAM) is three. The number of rows of input signals when a modulator of 64 QAM is used in a modulation system of a lower level such as 16 QAM may be two. In the present invention, however, this signal expressed in three bits or less is converted into 4 bits in accordance with a conversion rule described below for all of applicable modulation systems.

It is assumed that the input signal in FIG. 5 is expressed by an offset binary code, and the output is expressed by a complement of 2. In order to express all the levels of one channel in each modulation system, m/2 bits are required in $2^m$ QAM. The input signal consists of 3 bits because of m=6 in 64 QAM for instance, and 2 bits because of m=4 in 16 QAM. And in a QPSK one bit is required because m=2. In the present invention, the total bit number of an input signal is converted into the bit number (m/2) of one channel of the modulation system of the maximum multi-level number +1 bit. In 64 QAM for instance, "1" is added to a figure lower by one digit so as to include (6/2+1)=4 bits. For 16 QAM, "0" is further added to a lower figure. Then, in order to convert an offset binary code into a complement of 2, the most significant bit ("MSB") is inverted. Based on the nature of the rule described above, for example, the highest level "111" of 64 QAM is added with "1" at the lower figure thereof, and the MSB is inverted thus showing "0111". The highest level "11" of 16 QAM is added with "1" at the lower figure thereof, and a "0" is further added at the lower figure, and the MSB is inverted thus showing "0110".

Through the conversion described above, signal points become symmetrically positive and negative, thus making it possible to set a DC level which has a central value for all signal points at 0 for all modulation systems. Here, although it is possible to arrange so that the DC level does not change by altering the modulation system even when "0" is added to the first low order digit in place of "1", the DC level does not become "0". Since the conversion circuit of the digital filter can handle only a limited bit number, overflow occurs when the converted value exceeds the extent thereof, thus producing an error in conversion. In order to restrain the circuit scale to the minimum in the extent where no overflow of the conversion circuit is generated, it is preferable to set the DC level to 0 since it is required that the positive and negative maximum values of a signal are balanced.

The 64 QAM which is a QAM modulation system in which the signal point number is power of an even number of 2 has been explained above. As to a QAM modulation system in which the signal point number, such as 32 QAM, is a power of an odd number of 2, a part of signal points of a QAM system of power of an even number of 2 having the power number one above is used. Therefore, when it is made not to input a combination-forbidden signal, it is possible to apply the conversion system of the present invention as it is.

Further, the present invention is also applicable to a modulation system of higher multi-level such as 256 QAM.

As described above, the apparatus for multi-level quadrature amplitude modulation of the present invention has such effects as follows.

(1) Since only conversion of an input signal is made at the digital filter input, the apparatus is realized with a smaller-scaled ROM or a simpler logical circuit as compared with a conventional example which performs processing with the output of a digital filter, and increase in the circuit scale is insignificant. Further, the circuit of high-speed operation is unnecessary, and the operation speed of the circuit can be made higher by that portion.

(2) Since the mean power of the digital rolloff filter outputs is almost the same and the DC level does not change depending on the modulation multi-level number, adjustment of the DC level of the modulator due to alteration of the modulation multi-level number and alteration of the level diagram become unnecessary.

(3) It is possible to set the DC level to 0 irrespective of the modulation system.

(4) Variation of mean power depending on the modulation system is small to such an extent that no influence is exerted upon the characteristics of the quadrature modulator.

What is claimed is:

1. A method for modulating input data of different input bit members for each orthongonal channel by a plurality of multi-level quadrature amplitude modulations, comprising the steps of:

converting said input data into output data having the same bit number based on a prescribed conversion rule for each orthogonal channel;

filtering said converted output data by a digital filter;

converting an output of said digital filter into an analog signal by a D/A converter; and modulating said analog signal by a quadrature modulator.

2. The method as in claim 1, wherein, in operation as a quadrature amplitude modulation system at a $2^m$ or $2^{m-2n}$ value (m is an integer of 4 or more, and n is an integer of 0 or more), said prescribed conversion rule specifies that a pattern "1, 0, 0, . . ." of a bit number (n+1) is added to a lower figure of the least significant bit of a digital input signal in a (m/2−n) row thus converting the input signal into a signal in a (m/2+1) row, and the most significant bit of said signal in a (m/2+1) row is inverted so as to convert into a 2' complement.

3. The method as in claim 1, wherein said digital filter is a Finite Impulse Response (FIR) type digital rolloff filter.

4. An apparatus for modulating input data of different input bit numbers for each orthogonal channel by a plurality of multi-level quadrature amplitude modulations, comprising:

a code converter converting said input data into output data having the same bit number based on a prescribed conversion rule for each orthogonal channel;

a digital filter shaping a waveform of the output of said code converter;

a D/A converter converting the output of said digital filter into an analog signal; and a quadrature modulator quadrature-modulating the output of said D/A converter.

5. The apparatus as in claim 4, further comprising, when said prescribed conversion rule is made to operate as a quadrature amplitude modulation system of a $2^m$ or $2^{m-2n}$ value (m is an integer of 4 or more, and n is an integer of 0 or more), means for adding a pattern "1, 0, 0, . . ." of a bit number (n+1) to a lower figure of the least significant bit of a digital input signal in a (m/2−n) row thus converting the input signal into a signal in a (m/2+1) row, and means for inverting the most significant bit of said signal in a (m/2+1) row thus converting the signal into a complement of 2.

6. The apparatus as in claim 4, wherein said digital filter is a Finite Impulse Response (FIR) type digital rolloff filter.

* * * * *